Sept. 12, 1933.  J. P. TARBOX  1,926,692
DRIVING SYSTEM AND METHOD OF OPERATING SAME
Filed April 24, 1930   2 Sheets-Sheet 1

INVENTOR.
John P. Tarbox

Sept. 12, 1933.  J. P. TARBOX  1,926,692
DRIVING SYSTEM AND METHOD OF OPERATING SAME
Filed April 24, 1930   2 Sheets-Sheet 2

INVENTOR.
John P. Tarbox

Patented Sept. 12, 1933

UNITED STATES PATENT OFFICE 1,926,692

1,926,692

DRIVING SYSTEM AND METHOD OF OPERATING SAME

John P. Tarbox, Philadelphia, Pa., assignor to Budd Wheel Company, Philadelphia, Pa., a corporation of Pennsylvania Application April 24, 1930. Serial No. 446,948

13 Claims. (Cl. 60—53)

A driving system for wheel road vehicles of my invention is a fluid pressure driving system, yet more specifically, an hydraulic driving system. Some aims and objects are the utilization of a new and improved form of internal gear motor known as the "gerotor", in such an organization of elements as to eliminate entirely the difficulties experienced in the operation of hydraulic systems of transmission. Such difficulties have heretofore arisen through inefficiency of hydraulic motors employed of reciprocating and geared types, through leakages even at low pressure, through inability to utilize high pressures due to improper organization of parts, churning and aerating due to the development of gases and air leakages, undue heating of the fluid of transmission incident to throttling and other wire drawing actions, frictions, etc., and outstandingly, inadequate means to remove the heat from the liquid of transmission.

My invention has yet other and more important aims and objects. It is aimed to lighten the weight of the vehicle as a whole. Greater reliability and durability of the pumps and motors are ends sought. Simplification of the entire vehicle transmission is sought. Perfection of control of a vehicle is a leading object reaching to the goal of automatic transmission. It is moreover aimed to combine the braking and driving functions in one and the same element throughout the vehicle whereby the motors may be utilized to perform the braking function and separate brakes are not required. Automatic coordination between braking and driving functions is achieved. Ancillary aims are the utilization of the hydraulic transmission system to supply the power for steering and both the power and the lubricant for the general lubricating system of the vehicle. Over all it is sought to intensively improve the efficiency of power transmission from the prime mover to the wheels and the efficiency of operation and control of the vehicle at large.

These aims and objects I attain, by embodying a gerotor motor in the hub of each wheel in such manner as to constitute it at once hub, bearing, driving motor and brake for the wheel, by utilizing a system of gerotors in multiple to supply fluid pressure power in common to said motors, by connecting the pumps and the motors through a system of supply and exhaust conduits of reservoir-like capacity appropriately provided with heat radiating means, by controlling the connection of the multiple supply pump of the motors through a valve responsive to change in speed of the prime mover to decrease the pressure of transmission in proportion to increases in speed of the prime mover, and at the same time, responsive to increases of torque on the vehicle wheel to increase the pressure of fluid transmission, by super-imposing manual control upon the automatic speed and torque control recited, and by various and sundry devices of organization which can best be understood by reference to the drawings.

Of the drawings—

Figure 1:
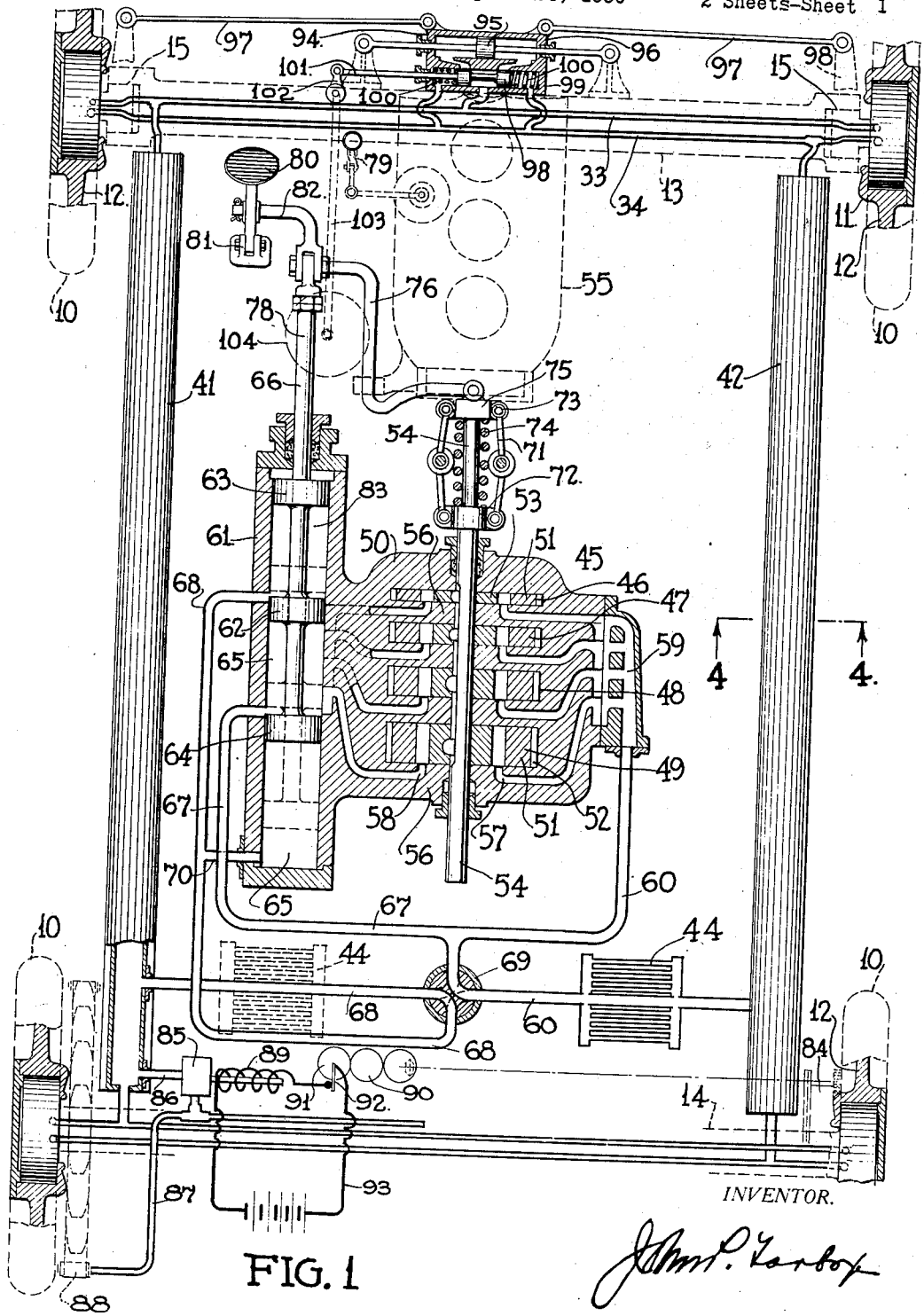
Figure 1 is a diagrammatic illustration in plan as respects the chassis of a vehicle of the system at large, the parts being generously sectioned and broken away to show internal arrangement.

The wheels of the vehicle, shown in dotted outline, are four in number and are commonly designated 10, the naves of these wheels 11 and the spokes which interconnect the nave to the rim (not shown) 12. The wheels are supported from the relatively fixed axles 13 and 14 shown in dotted lines. Such fixed axles are commonly known as stationary axles. The front axle 13 supports its wheels through the intermediary of the steering knuckles 15 while the rear axle 14 directly supports its wheels.

Figures 2, 3, 4, 5:
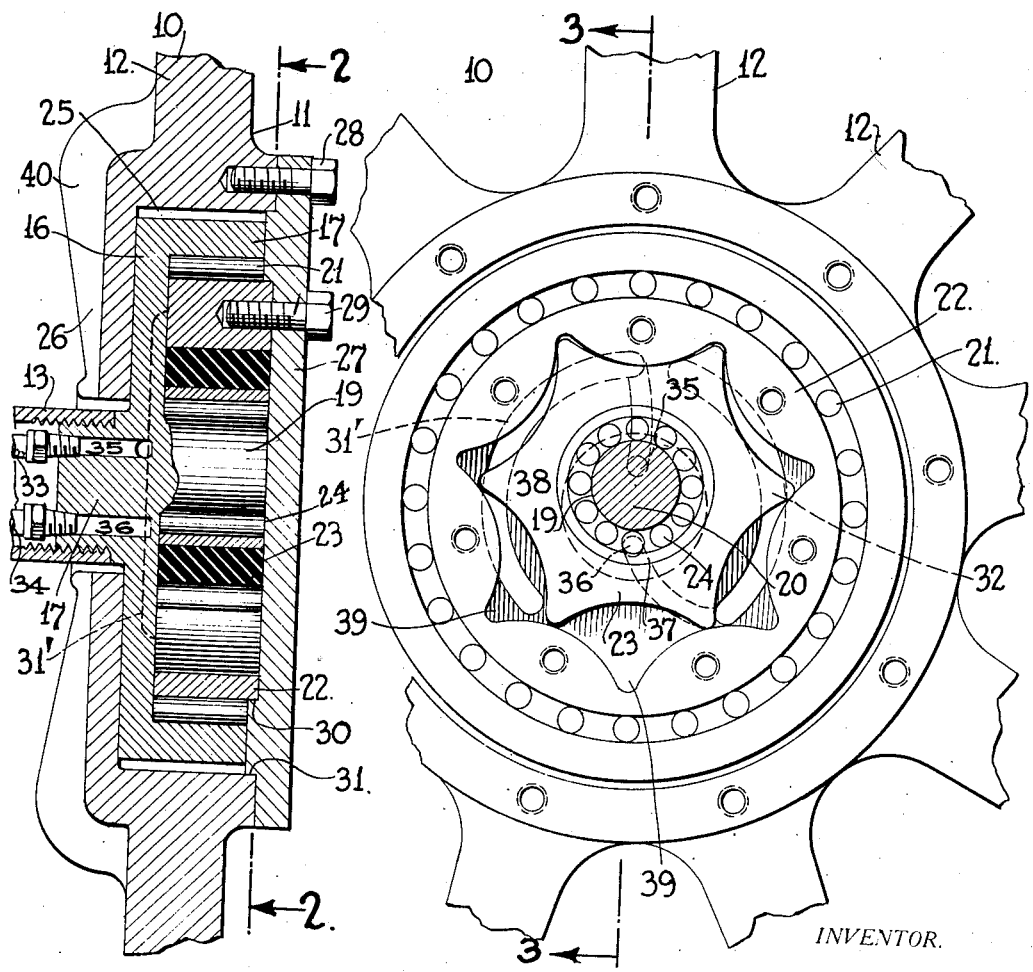
Figure 2 is a side elevation approximately on line 2—2 of Fig. 3 showing a wheel and its motor with the cover plate removed.
Figure 3 is an axial cross section of a wheel and its motor taken approximately on line 3—3 of Fig. 2.
Figure 4 is a transverse cross section of one of the supply or delivery conduits of reservoir capacity appearing in Fig. 1 and taken on line 4—4 of that figure.
Figure 5 is a diagram showing the development of the control valve and port of the pumps.

Such wheel supports as shown in Figs. 2 and 3, particularly Fig. 3, consist in each case of a disc 16 carried from the end of the axle. The axle is tubular and supports the disc by means of a stud 17 integral with the disc and threaded or otherwise secured within the end of the tubular axle. The disc 16 is provided with an annular flange 18 concentric with the axis of the axle. It is also provided interiorly of the annular flange and in annular arrangement therewith with a stub shaft 19 eccentric as respects the axis of the stationary axle 13 which axis is designated 20 in Figs. 2 and 3.

Journaled by means of roller bearings 21 within the annular flange 18 of disc 16 is the gear annulus 22 of the gerotor motor. Journaled on the eccentric stub shaft 19 in internally geared relation to the annulus 22 is the internal gear 23 of the gerotor, in turn borne by roller bearings 24 about the stub shaft 19. The nave 11 of the wheel 10 is provided with a channeled radial recess 25 within which it embraces the disc 16 of the stationary axle and the rotors 22 and 23 which are journaled within it. The inside wall 26 of the nave 11 makes a ground fit with the inside face of the disc 16. The outside wall 27 of the nave 11 is removable from the body of the nave as by bolts 28 and is removably secured to the gear annulus 22 by bolts 29. The channeled recess 25 is deep enough to provide clearance of the flange 18 of the disc 16 and the wheel 10 is thereafter borne from roller bearings 21 through annulus 22, bolts 29 and the outside and removable wall 27 of the nave. To improve the centering of the wheel about the axis of shaft 13 and bearing 21, side wall 27 is provided with annular shoulders 30 and 31 which receive respectively the outside of the annulus 22 and the bottom wall of the recess 25.

Fluid pressure is supplied the ports 31' and 32 of each gerotor through inlet and exhaust tubes 33 and 34 having a threaded connection with the stub 17 of disc 16. Ports 31' and 32 are formed in the outer face of the disc 16 as clearly appears in dotted lines in Fig. 3 and communicate with the conduits 33 and 34 through passageways 35—36 drilled or otherwise formed in the disc 16 and stub 17. The manner in which the fluid actuates the motor is fully described in the patent issued to Myron F. Hill, No. 1,682,564, Compressor, Aug. 28, 1928, and need not be particularly described here. Other patents issued to Myron F. Hill show other arrangements and doubtless there are yet others than those disclosed by him. So also said patents of Myron F. Hill disclose several different kinds of gerotors any one of which might be substituted with necessary organization of parts for that one I have illustrated but the organization of parts disclosed in Figs. 2 and 3 is entirely a part of the invention claimed herein.

Annulus 22 makes a ground fit with the outer face of the disc 16. The inner face of the removable side wall 27 of the nave 11 likewise makes a ground fit with the outer edge of the flange 18. Clearances are established through regulation of the axial depth of the recess 25 and the seating of the removable side wall 27 on the nave 11. The clearances are such as to insure sufficient tightness of all joints to cut down loss by leakage. There is expected to be such seepage between the outer face of the disc 16 and the annulus 22 as to provide adequate lubrication for bearing 21 and still further for the surfaces between annular flange 18 and the side wall 27, and yet again for the contacting faces of the inside side wall 26 and the disc 16. But this seepage is limited by the clearance to precisely that amount required for lubrication and by reason of the triple barriers constituted by the pairs of parts 16—22, 27—18 and 26—22, it may be controlled with absolute certainty.

The internal gear 23 I make composite, constituting it an inside metal ring 37 of cylindrical form directly borne from the bearing 24 and an outside ring 38 of rubber or other elastic material which may be distorted by fluid pressure. By making this member 38 of rubber of proper consistency and of proper initial dimensions, oversized if desired, the fluid pressure in the chambers 39 of the gerotor may distort the outer zones of the member 23 to effect absolutely leakproof contact of its side faces with the disc 16 and the side wall 27 respectively, preventing all leakage radially inwardly other than that desired to properly lubricate bearing 24, and at the same time develop a radially outward movement of the peaks of the teeth and insure very tight sliding contact with the teeth of the annulus 22 and limit to a veritable minimum leakage from port to port of the gerotor.

There inheres in this type of motor a very small amount of wire drawing, practically none at all, by reason of the opening of all chambers in common to the ports at all times excepting when in process of fluid transfer from one port to the other as exemplified by the bottommost chamber 39 illustrated. There is therefore a very minimum amount of heat generated in the operation of the motor itself. But such heat as is there generated, together with such heat as is in the fluid when it enters the motor by inlet and exhaust tubes 33—34, is dissipated to a large extent through the large metal mass of the motor directly to the nave of the wheel and through the nave to the revolving spokes 12 of the wheel. The great aggregate area of the contracting surfaces of the rotating parts insures a rapid and efficient transfer of this heat to the nave 11. The integral formation of strengthening and radiating ribs 40 on the inner side wall 26 together with the integral formation of spokes 12 with the side wall 26 and the strengthening ribs 40 greatly facilitates this heat transfer. Rotating in free and constantly changing air the integral metal spokes rapidly give off their heat.

Very little, if any, excess heat should be present in the fluid pressure transmission when it reaches the motors in the wheels. Supply and exhaust conduits 41 and 42 of reservoir-like capacity (see now Fig. 1 and Fig. 4) extend substantially the full length of the vehicle and connect respectively with the supply and exhaust tubes 33 and 34 which are arranged interiorly of the tubular axles 13 and 14. These conduits 41 and 42 are are so very large that they have a capacity to manifoldly supply the normal flow required for full load of the wheel motors. The flow of fluid therefore is at a very greatly reduced rate, and great bodies of fluid lie therein as in a reservoir. The exterior surfaces of these conduits 41—42, as shown in Fig. 4, are provided with autogenously welded fins 43 their full length. The action of the air through which the vehicle passes on these longitudinally extending fins rapidly removes excess heat from the fluid within the conduits. In such case they too may be provided with autogenously welded fins 43 for the purpose of improving the cooling action. And yet further, special radiators 44 may be provided in transverse connection between the conduits 41 and 42 or in the connections between them and the transmission devices now to be described. These further devices 44 may partake of the usual form of radiators as illustrated or they may partake of the form of the device in Fig. 4. If conduits 41—42 constitute a part of the chassis of the vehicle, cross connections which include the radiators 44 might constitute the cross members of such chassis and use will be made of the form of device shown in Fig. 4.

The motors in the wheels are supplied with power from a multiple number of hydraulic pumps designated at large 45. Four of these pumps are shown designated respectively 46 to 49 and progressively of increasing capacity as indicated by the relative thickness of the gears which compose them. They are all gerotors of the type devised by Myron F. Hill. They are shown diagrammatically in one and the same casing 50. The annulus 51 of each is journaled exteriorly in the casing on roller bearings 52. The internal gear 53 is keyed to shaft 54 of the prime mover 55 of the vehicle, shown in dotted lines. Obviously, the casing 50, shown diagrammatically as an integral whole, will be appropriately transversely divided to admit of the assembly of the series of gerotors in a proper manner. Intervened between the respective gerotors 46 to 49 are port plates or diaphragms 56 which contain the inlet and delivery ports 57 and 58 respectively. They are all diagrammatically shown. But in general form it is understood that they may be similar to the ports 31 and 32 illustrated in Figs. 2 and 3 in connection with the wheel motors or of the form shown in any of the patents on such devices issued to Myron F. Hill or others. As driven commonly by shaft 54 of the prime mover, these gerotors 46 to 49 will induct fluid through the inlet ports 57 in quantities proportional to their different capacities and discharge the same through the outlet ports 58.

The inlet ports 57 are commonly connected to the inlet manifold 59 which is joined by a conduit 60 with the conduit 42 which is normally the exhaust conduit of the system. The outlet ports 58 are joined commonly to the control valve 61 of the transmission.

This control valve 61 is of a piston type comprising a main piston valve disc 62 and two subordinate piston valve discs 63 and 64 mounted on one stem and sliding commonly in one and the same valve chamber 65. Valve chamber 65 is connected in its central region commonly with all of the discharge ports 58 of the pumps 46 to 49. Its opposite ends extend oppositely from this central region.

Exhaust ports 58 terminate in the walls of chamber 65 in the central region in an overlapping relation as respects each other as illustrated more exactly in Fig. 5. This figure represents these ports and the valve 62 (which is shown by the shaded zone) as they might be developed in plan form by laying flat the cylindrical surfaces of valve chamber 65 and valve 62 respectively. The ports are designated 58—46, 58—47, etc., in accordance with the pumps to which they respectively connect. With valve 62 in the position shown in Fig. 5 and also shown in Fig. 1, all of these ports are open in the zone between valve discs 62 and 64 but are closed to the zone between valve discs 62 and 63. The arrangement of valve discs 62—63—64 on the valve stem 66 is such that the distance between their adjacent faces is substantially equal to the length of valve chamber 65 covered by the longitudinal expanse of ports 58—46 to 58—49, whereby all of the ports may be opened either between the adjacent faces of discs 62—64 or closed off entirely from the space between these faces and opened entirely to the space between the faces of valve discs 62—63 as indicated by the dotted line positions of these valve discs in Fig. 1.

Communicating with the zone of the valve chamber 65 covered by the expansive ports 58—46 to 58—49 is by-pass conduit 67 which connects directly with conduit 60 and the inlet manifold 59. Conduit 67 enters the casing of valve 61 at a point between the endmost valve port 58—49 and the adjacent face of valve disc 64 with the ports shown in the position of Fig. 1 when the valve ports are all open to the space between valve discs 62—64 and closed to the space between valve discs 62—63. See also Fig. 5 in this connection which illustrates the ports in the same general relationship.

Connected with the casing of valve 61 in the zone between valve disc 62—63 and just in advance of the uppermost or first port 58—46 is discharge conduit 68 the connection of which appears both in Fig. 1 and Fig. 5. The points of connection of conduits 67—68 are such that when the valve is in the full open dotted line position, conduits 67—68 remain in open connection with the spaces between respective pairs of valve discs 62—64 on the one hand and 62—63 on the other hand. Discharge conduit 68 connects by way of a two way reversing valve 69 with supply conduit 41 of the fluid pressure system. By branch connection 70, 68 is connected with the lower extension of valve chamber 65 near its extremity whereby fluid from the discharge conduit 68 enters the valve chamber at this end and exerts itself upon the outer face of valve disc 64 in a direction tending to return the valve to the closed position shown in full lines.

Two way plugs valve 69 contains a plug which commonly connects normally conduits 60 and 67 of the inlet and by-pass conduit to the exhaust conduit 42 of the system, and on the other hand normally connects discharge conduit 68 with the supply conduit 41. The arrangement is such that by turning this valve through 90°, its passageways are moved to the dotted line position and all its connections are alternated, conduit 41, normally the supply conduit, being connected to the inlet and by-pass conduit 60 and 47, and exhaust conduit 42 being connected to discharge conduit 68. Thereby supply and exhaust conduits 41—42 are reversed in their function and fluid pressure is applied to the reverse side of the motors in the wheel and the direction of the movement of the vehicle may be reversed.

Valve 61 is actuated primarily from speed responsive device 71 illustrated in the form of a centrifugal ball governor on shaft 54 of the prime mover. One collar 72 of this governor is fixed to shaft 54 to rotate the governor and develop its centrifugal action and the other collar 73 is slidably mounted on the shaft and actuated under centrifugal force to move axially toward the other collar 72 against the pressure of spring 74 as common in such governors. This relatively movable collar 73 has a connection through collar 75 usually connecting in a groove on the member 73 (not shown since so well known) with a reciprocable link 76 connecting with the uppermost or forward end 78 of the valve stem 66. Through the connecting link 76 the movements of the governor are imparted to the discs 62 to 64 of the valve 61. Prime mover 55 has its speed controlled by the usual throttle lever 79 which may function to control the prime mover in any of the known ways.

Also connected with the valve stem 76 through its upper end 78 to manually control the same by speed responsive device 71 is a foot pedal 80 having a pivotal mounting at 81 and effecting its connection by the pivoted link 82.

So organized, the driving system of my invention is utilized to propel the vehicle as follows. The motor being started in any well known manner and idling at low speed, the valve discs 62—63—64 occupy the positions shown in full lines, the speed responsive device 71 being subjected to but little centrifugal force and its springs 74 being so adjusted as to preclude imposition of force on valve stem 66 sufficient to move the discs from the full line position. In starting, should speeds greater than the idling speed be required, the foot may be kept upon pedal 80 in opposition to the action of the speed responsive device 71 and the speed responsive device thereby prevented from prematurely opening valve 61 and starting the vehicle in motion. So utilized, the foot pedal 80 constitutes a lock device to preclude the control of the speed responsive device 71 earlier than desired.

The motor being in condition to take its load and it being desired to operate the vehicle forwardly, one releases pressure on foot pedal 80 and opens the throttle 79 to any degree desired. As the motor speeds up, the speed responsive device 71 under the urge of its centrifugal force moves valve stem 66 and valve disc 62—63—64 rearwardly in the valve chamber 65. First port 58—46, the most forward of the ports, is opened to the space between valve discs 62—63 cutting the first pump 46 off of its connection with the by-pass 67 and on to direct connection with discharge conduit 68. By virtue of the elongated character of the ports 58, 46 to 58—49, this cut off from the by-pass ports and cut on to the discharge conduit 68 is complemental. No consequential wire drawing, if any, results. Pump 46 is a small volume high pressure pump and the placement of this pressure in the discharge conduit 68 promptly builds up pressure in the supply conduit 41 and its connected motors and starts the vehicle at low speed incident to the small volume of pump 46 but at high torque incident to the relatively high pressure of the small pump 46.

This discharge pressure of pump 46 is balanced in its effect on the valve as between the adjacent faces of discs 62—63, but through and by virtue of the branch connection 70 with the rear end (the bottom end in the figure) of chamber 65 exerts an unbalanced pressure on the rear face of valve disc 64 tending to return the valve toward its initial position against the action of the speed responsive device 71. So speed responsive device 71 and pressure responsive device 70—65—64 counterpoise each other and counter balance the effects of the speed of the prime mover and the torque on the vehicle wheels against each other. If the starting torque required to move the vehicle is slight, the discharge pressure built up in conduit 68 by the high pressure low volume pump 46 is small and the action of the speed responsive device 71 is not appreciably retarded. If, on the other hand, the vehicle is on an uphill incline or for other reason, subjected to high starting torque conditions, the pump 46 builds up a very substantial or even a very high pressure in the conduit 68 as the vehicle is started into motion and the valve 61 is precluded from opening more than a moderate amount under the influence of the speed responsive device 71. Such counteraction may preclude movement beyond the first port 58—46 until after prime mover 55 be given its full throttle and the speed of the vehicle is appreciably increased with the resultant decrease in starting torque.

As the starting torque decreases, however, the prime mover speeds up incident to a reduction of pressure of discharge conduit 68 re-actively on pump 46 and controllably on valve 61, and speed responsive device 71 further opens valve 61 carrying the primary valve disc 62 rearwardly (downwardly in Fig. 1) opening the second port 58—47 and perhaps even in succession as the vehicle speeds up and its wheel torque is further reduced, also the third and fourth ports 58—48 and 58—49, finally, with the motor at full speed and traveling on a level when the vehicle is at full speed reaching the dotted line position shown, in which all ports are open to the discharge conduit 68 and all pumps 46 to 49 are delivering their combined volume to supply conduit 41 thereby achieving highest speed transmission of fluid throughout the system.

It is to be noted that the volumes of pumps 46 to 49 are graded upwardly, and likewise have the same speed as prime mover 55. Progressively discharge pressure under both single and combined operation is decreased. These pumps may, if desired, be constituted of one and the same size, but I prefer to grade their sizes in accordance with the specific speed variations desired and with the specific pressure variations. At any time it is desired during the automatic operation of speeding up in response to the opening of throttle 79, the automatic operation may be altered by superimposing upon it a pressure of the foot upon pedal 80 to thereby introduce manually a force opposing the action of the speed responsive device 71 and tending to restrict or to diminish the port openings of valve 62. While the right foot is kept on throttle 79, the left foot may be kept on the manual regulatory pedal 80.

The vehicle being under way at any speed and it being desired to decrease that speed, one has only to let off on the throttle 79 whereupon the speed of prime mover 55 is decreased, speed responsive device 71 diminishes the value of the force tending to open valve 62 and the valve closes to some extent opening more of ports 56—46 to 56—49 to the by-pass 67 through space 65 and less of them to the discharge conduit 68 through space 83. It being desired to stop or brake the vehicle, throttle 79 is released altogether whereby the speed of the prime mover approaches its normal idling speed immediately, the force generated by the speed responsive device 71 being decreased very rapidly. Correspondingly, the pressure in discharge conduit 68 falls. The motors in the wheels become converted into pumps under the inertia of the vehicle, drawing fluid through the supply conduits 41 and delivering it under pressure to the return conduit 42 and on to the pumps 46 to 49 through the conduit 60. Such delivery converts pumps 46 to 49 into motors supplying power to drive the prime mover 55 at a speed in excess of that of its idling speed. The prime mover, therefore, becomes automatically a brake for the vehicle just as it does when a car is thrown in low gear going down hill for the purpose of braking the car. Such action retards the deceleration of the prime mover and renders the action of valve 62 in stopping the vehicle gradual. This gradual action is likewise furthered by the reduction of pressure in the supply conduit 68 and therefore in the space 65, there being less pressure on disc 64 opposing the speed responsive device 71. A very smooth deceleration of the vehicle is the result. The relations of the parts are such that for stopping in reasonable distances, this action is all that could be desired and the vehicle is gradually brought fully to rest as the energy of the vehice is used in driving prime mover 55, finally coming to a complete stop as valve 62 cuts off pump 46 completely as shown in its full line position. In this position no fluid transfer can take place between supply conduit 41 and return conduit 42 and the motors in the wheel are thereby fluid locked, since there can be no substantial leakage through them. The motors thus constitute full and effective primary brakes for the vehicle and no braking mechanism need be provided on the vehicle for this purpose. In case that it is desired to stop suddenly, one not only releases the throttle 79 but also applies full foot pressure to the degree desired on foot pedal 80 overcoming partly or fully the effects of the speed responsive device 71 and the torque responsive device 67—70 — 65—64 and thereby immediately partly or wholly closing off all parts 58—46 to 58—49 from the discharge conduit 68 and bringing the vehicle to a sudden stop with locked wheels. Such application, of course, needs be guardedly made just as in the case of sudden emergency applications of primary brakes in order to avoid locking of the wheels while the vehicle is yet under high speed and attain locking only at the instant when the speed is such that it may be safely done.

The reversal of the vehicle is achieved merely by rotating the plug valve 69 through 90° whereupon the transmission pumps 46 to 49 supply fluid initially to conduit 42 making it the supply conduit, and take fluid from conduit 41 constituting it the return conduit. In such conditions the vehicle is provided with precisely the controls and full speed variations in backward motion that it has in forward motion. The motors in the wheels as is evident are entirely reversible.

In all these operations of starting, of varying speed by increase or decrease of movement of throttle 79, of manual alteration by super-imposition of forces on pedal 80, of stopping by gradual or immediate release of throttle 79 and control of the time of stopping through pressure on pedal 80, the system operates without consequential fluid leakage by reason of the constructions of the pumps and motors, by reason of the elastic gearing as 38, which may also be used in pumps 46 to 49 as well as in the wheel motors, and by reason of the unique means of introducing the fluid into and taking it from the motors and the pumps. The system also operates without undue heating of the fluid incident to the nature of the pumps employed, in the form of gerotors, as distinguished from ordinary gear pumps, incident to the substantially entire absence of wire drawing following the use of such pumps and motors, the use of a graded series of pumps 46 to 49 and the control of the cut-on and cut-off of these pumps through the piston valve system governing their connection to discharge conduit and by-pass and functioning to complementally cut-on and cut-off such pumps. Such heat as is generated is effectively dissipated, first, through the exposed casings of the pumps 46 to 49 themselves and the circulation of air thereabout and about the control valve; second, through the radiation provided by the exposed discharge return and by-pass conduits; third, through special radiations 44 if needed; fourth, through the reservoir supply and return conduits 41—42 in which the fluid remains for considerable period of time and has its heat disposed through the fins 43 exposed to continual change of air in the travel of the vehicle; fifth, through similar exposure and radiation from the stationary axles 13 and the connections 33—34; sixth, through the extended areas of the casings in the motors of the wheel; and seventh, through the integral metallic wheel bodies 11 and the spokes 10 which rotate as the vehicle travels and continually transfer heat to the atmosphere. Nor is there induction of air into the system to create churning since at all times, except when the vehicle is actually at rest, there is positive pressure only on the parts of the system.

Emergency brakes required by law in certain states may be applied in the form of band brakes or chocks connected with one or more individual wheels. These are illustrated diagrammatically in connection with the wheel on the lower right of Fig. 1 and designated 84. They may take the usual form of band brakes operated by the usual emergency brake lever.

The driving system I have described has been illustrated in the main diagrammatically. Figs. 2 to 5 are in many respects diagrammatic and Fig. 1 is almost entirely diagrammatic. Very obviously, the devices which go to make up the system may take on any one of a great number of forms and their details may be many and various without departing in any wise from the generic spirit of my invention yet there are certain details which are part and parcel of the generic spirit of my invention. Likewise the organization and arrangement of the elements of the system and their connection with each other may be altered to some extent and in some cases to a considerable extent without in any wise departing from the generic spirit of my invention. Therefore, for these and yet other reasons and perhaps more well known reasons, the scope of my invention should be measured by its relation to the prior art rather than by the diagrammatic showing and the circumstantial terminology of the foregoing specification and annexed claims.

What I claim as new and useful and desire to protect by Letters Patent is:—

1. A driving system for wheeled road vehicles comprising a fluid pressure motor connected to drive a wheel, and a plurality of fluid pressure pumps in multiple having a common by-pass and a common delivery connected to supply fluid pressure to said motor, a piston valve controlling said delivery and by-pass connections and balanced save for delivery pressure, means for applying delivery pressure to the valve in a direction tending to close off the pumps seriatim from the delivery and connect them with the by-pass, and means directly responsive to the speeds of the pumps connected to tend to open said valve in proportion to the increase in speed and in opposition to the tendency of said delivery pressure.

2. A driving system for wheeled road vehicles comprising a fluid pressure motor connected to a driving wheel, a fluid pressure pump connected to supply motive fluid to said motor, a prime mover driving the pump, a valve controlling the application of fluid to said motor, means responsive to changes in speed of the prime mover, a direct connection between said speed responsive means and said valve, whereby the said means and valve move together, and means responsive to changes of fluid pressure imposed on said motor and co-operating with said speed responsive means to jointly govern the position of said control valve.

3. A driving system for wheeled road vehicles comprising a fluid pressure motor connected to a driving wheel, a fluid pressure pump connected to supply motive fluid to said motor, a prime mover driving the pump, a valve controlling the application of fluid to said motor, means responsive to changes in speed of the prime mover and having a shiftable element, a rigid connection between said element and said valve whereby the valve is displaced in direct proportion to the movement of the said shiftable element, and means responsive to changes of fluid pressure imposed on said motor serving to govern the extent of such movement.

4. A driving system for wheeled road vehicles comprising a fluid pressure motor connected to a driving wheel, a fluid pressure pump connected to supply motive fluid to said motor, a prime mover driving the pump, a valve controlling the application of fluid to said motor, means responsive to changes in speed of the prime mover and having a shiftable element, a rigid connection between said element and said valve whereby the valve is displaced in direct proportion to the movement of the shiftable element, the arrangement being such that an increase in speed tends to move said valve in a direction to increase the supply of fluid to said motor, and means responsive to changes of fluid pressure imposed on said motor serving to oppose the last mentioned movement of said valve and to decrease the supply of fluid to said motor as the pressure increases.

5. A driving system for wheeled road vehicles comprising a fluid pressure motor connected to a driving wheel, a fluid pressure pump connected to supply motive fluid to said motor, a prime mover driving the pump, a movable member controlling the delivery of fluid to said motor, a speed responsive device driven by said prime mover and having a shiftable element directly connected with said controlling member so that the valve always moves with the said shiftable element, and automatic means for governing the position of said controlling member in accordance with the fluid pressure imposed on said motor.

6. A driving system for wheeled road vehicles comprising a fluid pressure motor connected to a driving wheel, a fluid pressure pump connected to supply motive fluid to said motor, a prime mover driving the pump, a freely movable member controlling the amount of fluid delivered to said motor, means responsive to changes in speed of the prime mover and having a shiftable element, a direct connection between said element and said controlling member whereby the said controlling member is displaced in direct proportion to the movement of the former to increase the delivery of fluid to the motor as the speed of the prime mover increases, and means acting on said member tending to oppose such displacement in proportion to the increase of fluid pressure imposed on said motor.

7. A driving system for wheeled road vehicles comprising a fluid pressure motor connected to a driving wheel, a fluid pressure pump connected to supply motive fluid to said motor, a prime mover driving the pump, a movable member controlling the delivery of fluid to said motor, a speed responsive device driven by said prime mover and having a shiftable element directly connected with said controlling member so that the valve always moves with the said shiftable element, automatic means for governing the position of said controlling member in accordance with the fluid pressure imposed on said motor, and means for modifying at will the joint action of said speed responsive device and said fluid pressure means on said controlling member, whereby the position of the latter may be varied as desired.

8. A driving system for wheeled road vehicles comprising a fluid pressure motor connected to a driving wheel, a fluid pressure pump connected to supply motive fluid to said motor, a prime mover driving the pump, a movable member controlling the delivery of fluid to said motor, means responsive to changes in speed of the prime mover and means responsive to changes of fluid pressure imposed on the motor, said two means being connected to jointly govern said controlling member, and manual means for modifying at will the effect of changes in speed of the prime mover.

9. A driving system for wheeled road vehicles comprising a fluid pressure motor connected to a driving wheel, a fluid pressure pump, said pump having a series of delivery ports, a prime mover driving said pump, a supply conduit extending from said pump to said motor, a by-pass conduit connecting the intake and delivery sides of said pump, automatic means responsive to the speed of the prime mover for successively disconnecting the prime mover for successively disconnecting said delivery ports one after another from said by-pass conduit and connecting them to said supply conduit as the speed of the prime mover increases and means for superimposing a manual control upon said speed responsive means so as to modify or prevent the normal action thereof when desired.

10. A driving system for wheel road vehicles comprising a motor connected to a driving wheel, a source of power for the motor connected to a source of power thereto, a prime mover operating said source of power, a power control device controlling the application of power from the said source to the said motor, means responsive to changes in speed of the prime mover, a direct connection between said speed responsive means and said power controller, whereby the said power controller and speed responsive means move together, and means responsive to change in motor torque operating with said speed responsive means to jointly govern the position of said power controller.

11. A driving system for wheel road vehicles comprising a motor connected with the driving wheel, a source of power for said motor connected to supply power thereto, a prime mover operating said source of power, a movable member controlling the delivery of power to said motor, a speed responsive device driven by said prime mover and having a shiftable element directly connected with said power controlling member so that the power controlling member always moves with said shiftable element and automatic means for governing the position of said power controlling member in accordance with the torque of said motor.

12. A driving system for wheel road vehicles comprising a motor connected to a driving wheel, a source of power for said motor connected to supply power thereto, a prime mover operating said source of power, a movable member controlling the delivery of power to said motor, a speed responsive device driven by said prime mover and having a shiftable element directly connected with said power controlling member so that the power controlling member always moves with said shiftable element, automatic means for governing the position of said power controlling member in accordance with the torque of said motor, and means for modifying at will the joint action of said speed responsive device and said automatic means on said power controlling member, whereby the position of the latter may be varied as desired.

13. A driving system for wheel road vehicles comprising a member connected to a driving wheel, a source of power connected to supply power thereto, a prime mover operating said source of power, a movable member controlling the delivery of power from the source to said motor, means responsive to changes in speed of the prime mover and means responsive to changes of torque of the motor, such two means being connected to jointly govern said power controlling motor, and manual means for modifying at will the changes in speed of the prime mover.

JOHN P. TARBOX.